UNITED STATES PATENT OFFICE.

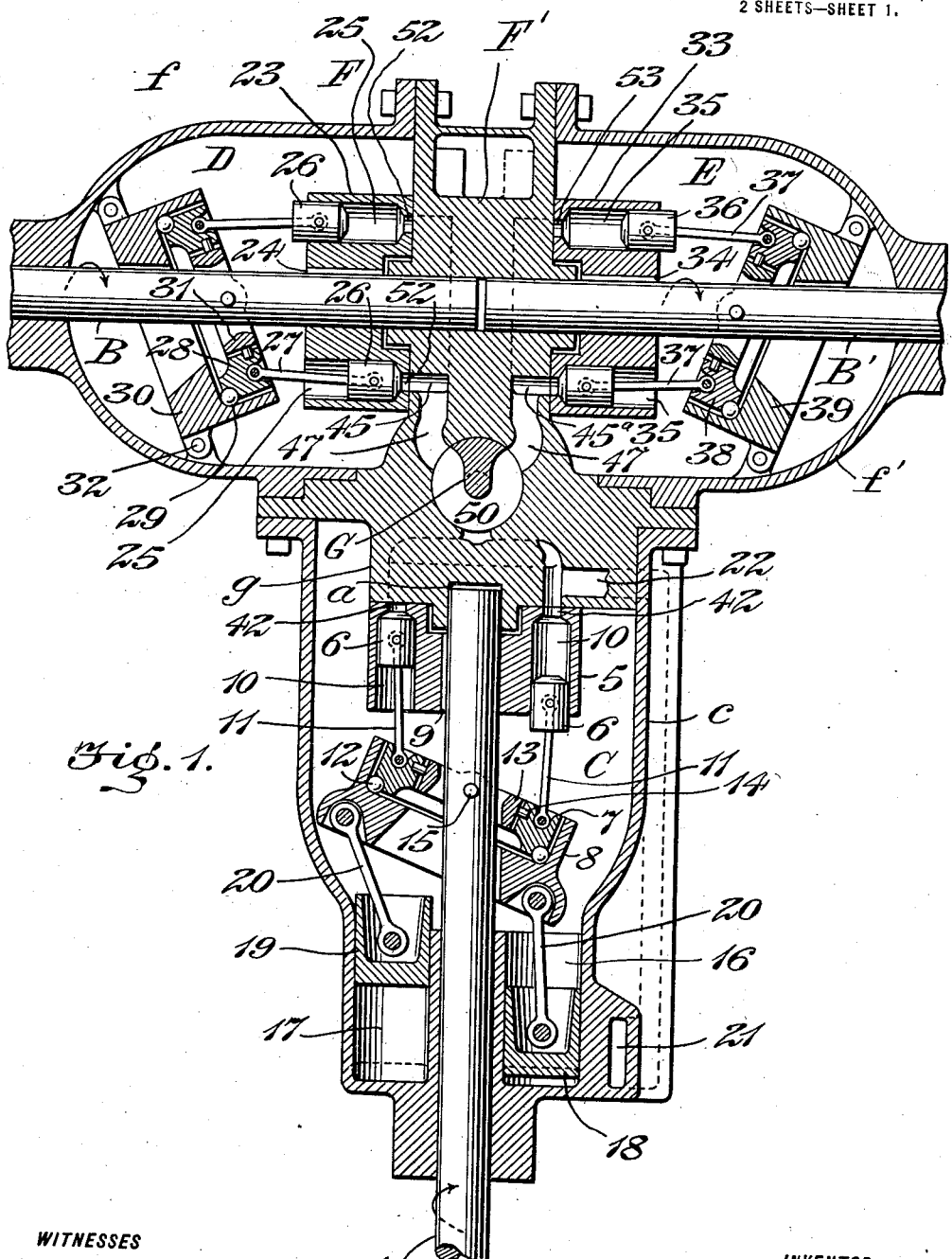

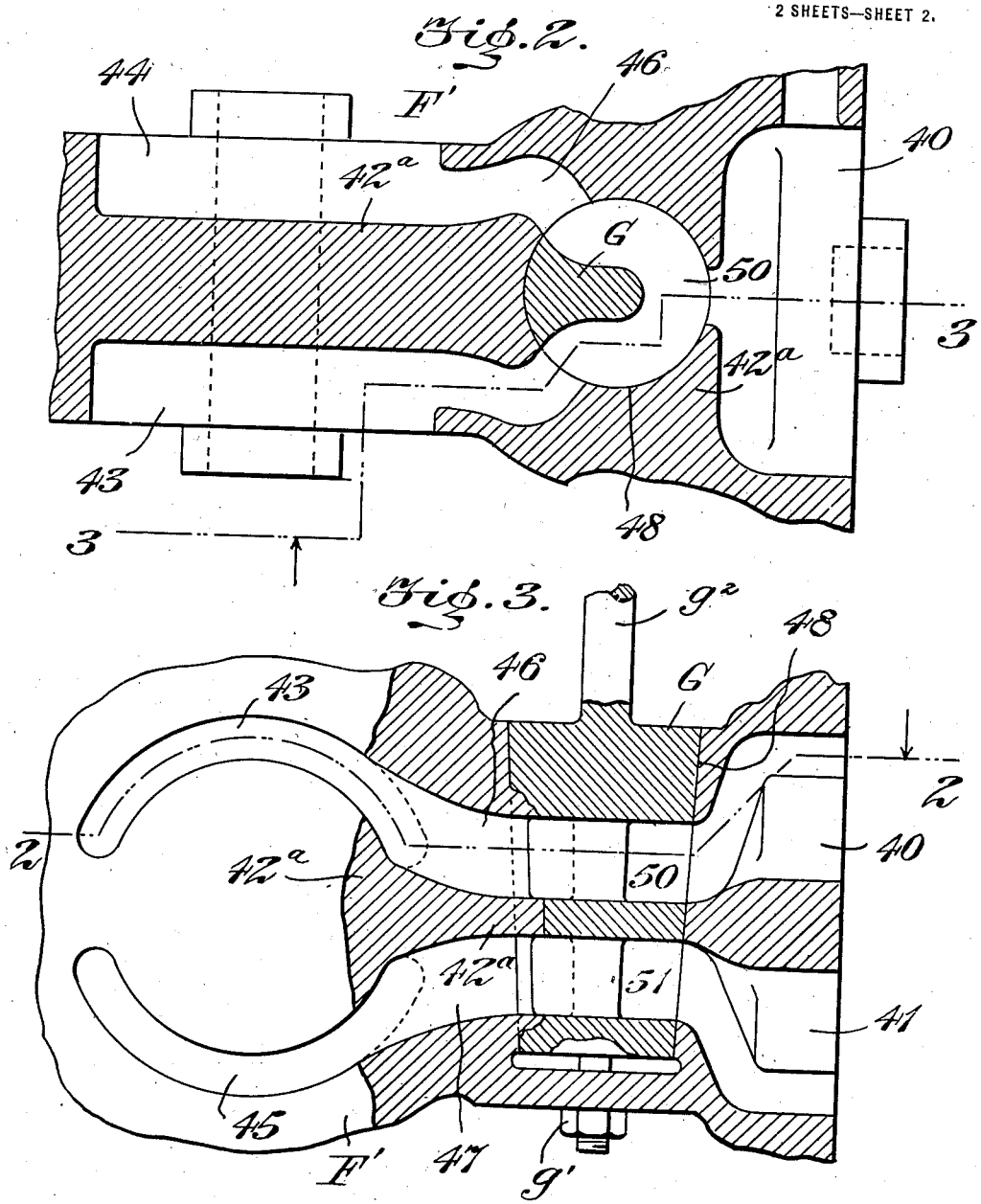

CHARLES SNOW KELLOGG, OF MONTCLAIR, NEW JERSEY.

DIFFERENTIAL GEAR.

1,227,055.  Specification of Letters Patent.  Patented May 22, 1917.

Application filed February 20, 1908, Serial No. 416,828. Renewed August 2, 1912. Serial No. 713,005.

*To all whom it may concern:*

Be it known that I, CHARLES SNOW KELLOGG, a citizen of the United States, residing in Montclair, county of Essex, and State of New Jersey, have invented a certain new and useful Differential Gear, of which the following is a specification.

This invention is a novel differential gear adapted for use in connection with all mechanisms wherein are employed devices of this character.

The invention is of especial value for use on self propelling vehicles, such as automobiles, and its use will be particularly described in connection with its application to the two-part driven shaft, or axle, commonly employed on such vehicles, though it will be understood that it may be applied to boats, as well as to various other uses.

The invention, in one aspect, embodies a liquid pumping mechanism, a plurality of liquid motors, adapted to be operated, individually or severally, by liquid under pressure delivered by the pumping mechanism.

In another aspect of the invention regulating or controlling mechanism is provided intermediate the pumping mechanism and the liquid motors whereby the quantity of liquid delivered to each motor may be regulated, thereby securing a variation of speed in the motors and a corresponding difference of power in their respective shafts.

The capacity of the pumping mechanism is made variable for the purpose of regulating the speed of the driven shaft. Furthermore, the pumping mechanism is preferably made reversible so as to enable the driven shafts to be operated forward or backward.

Then, again, the mechanism may be operated to serve as a brake to retard or lock the driven shafts, this function being accomplished by allowing the pumping mechanism to run idly or spin, the engine being in operation, whereby the out-flow of liquid from the motors meets with resistance and, consequently, stops or tends to stop the rotation of their respective shafts.

The function of a brake may be accomplished, also, by allowing the motors to operate the pumping mechanism, while the operation of the engine is discontinued, in which case the compression in the engine cylinders serves as the resistance to thereupon stop the pump and motors.

It will be understood, furthermore, that the liquid motors, individually or severally, may be reversed, or varied as to capacity, so as to permit a reversal of the driven shafts with respect to the driving shaft.

From the description given, it will be apparent that the driven shafts may be locked against rotation, while the driving shaft is free to rotate, and variable power and torque be put upon either driven shaft, and variable speed be created between the driven shafts, while rotating in either direction, and the driving shaft.

When used on automobiles, the invention serves several purposes, among which is the overcoming of the rapid rotation or spinning of one wheel when the other wheel becomes lodged or caught fast in a rut, or other obstruction, such spinning of the wheel being a serious disadvantage because of the fact that it occasions undue friction and wear on the tire thereof. The object is accomplished by such an organization of parts as will enable the full power of the engine or motor, or the main portion thereof, to be applied to the lodged or caught wheel, whereby the vehicle may be extricated from a rut or other obstruction with great ease and expedition.

In the accompanying drawings, I have illustrated one practical embodiment of the invention, but the construction shown therein is to be understood as illustrative, only, and not as defining the limits of the invention.

Figure 1 is a horizontal section, parts being shown in plan, of a liquid operated differential gear embodying this invention.

Fig. 2 is a horizontal section, on an enlarged scale, showing one form of a valve whereby the liquid under pressure from a circulating pump may be delivered equally to a plurality of motors, or to one of said motors to the exclusion of the other motor, the plane of the section being indicated by the irregular line 2—2 of Fig. 3.

Fig. 3 is a vertical section on the line 3—3 of Fig. 2 looking in the direction of the arrow.

A designates a driving member in the form of a shaft. This member may be operated directly by an engine, or indirectly by said engine, through suitable shafting gearing, or other mechanical appliances.

B, B' indicate the driven element which, as shown, is a divided shaft or axle, the parts of which are in alinement.

The driving element, A, operates a fluid circulating pump which, as shown, is of the reciprocating piston type. For certain purposes it is preferred to use a pump employing a plurality of reciprocating pistons which are operated from a cam or abutment, the latter being movable to vary the capacity of the pump. Although I may employ other forms of pumps, such as a rotary pump, or any mechanical equivalent for the pump, yet I have shown the invention as using the pump, C, of Fig. 1. The working parts of said pump are inclosed within a substantially fixed hollow member or casing, $c$, and said pump comprises a barrel 5, a plurality of reciprocating pistons, 6, a rotatable member 7, and a cam or abutment 8. The pump barrel or cylinder is made fast with the shaft for rotation therewith, as for example, by a key 9, and said barrel is provided with piston chambers 10 in which operate the reciprocating pistons 6. Said pistons are connected by the pitmen 11 with the rotatable member 7, the latter having ball bearing engagement at 12 with the cam or abutment 8. Said cam or abutment is mounted pivotally within the casing, $c$, by suitable trunnions (not shown), and the member 7 is connected by a universal joint with the driving member, A. As shown, the universal joint consists of a ring 13 which is pivoted by trunnions 14 to the member 7 and by trunnions 15 to the driving shaft or member, A, whereby the universal joint ring 13 rotates with the shaft, A, for the purpose of causing the member 7 to rotate therewith, and at the same time, said member 13 permits the member 7 to adjust or accommodate itself to changes in the positions of the cam or abutment 8.

The cam or abutment 8 for operating the pistons of the pump, C, is normally locked in a position inclined across the shaft, A, and with relation to the pump barrel 5, but said cam or abutment is adapted to be moved to a position at right angles to the shaft, A, and parallel to the pump barrel 5 when it is desired to adjust the pump out of service so far as concerns the circulation of fluid from the pump, C, to one or more motors, or the said cam or abutment 8 may be shifted to different inclined positions relative to the pump barrel for the purpose of varying the capacity of said pump, C. The adjustment of the cam or abutment 8 may be effected mechanically or by fluid pressure, substantially as disclosed in the pump mechanism of another application for "controllable speed and power transmitting mechanism" filed February 13, 1908, Serial No. 415,691. As shown in Fig. 1, the casing, $c$, is provided at one end with piston chambers 16 17 in which operate pistons 18, 19 respectively, said pistons being connected by pitmen 20 with the cam or abutment 8 at diametrically opposite points thereof. Fluid is adapted to be supplied to one cylinder, such as 17, and exhausted from the other cylinder, such as 18, by a suitable passage or passages, one of which is indicated at 21, said passages extending lengthwise of the casing, $c$, and communicating with a chamber 22 forming a part of a closed liquid circuit, all as more fully and at large appears by reference to my aforesaid application.

It is evident that the liquid pressure may be varied or reversed in the chambers 17, 18, so as to move the cam or abutment 8 to a position at right angles to the shaft, A, or into a reverse position to that shown in Fig. 1, or into any one of a number of positions whereby the pump may be moved into and out of operation, it may be reversed or driven ahead, or its effective pumping capacity may be varied as desired.

With the parts, B, B', of the driven shaft or axle are associated motors, D, E, respectively said motors being of equal capacity and power and they are arranged to individually operate the parts of the divided axle or shaft. Said motors or pumps are in all respects similar to the multiple piston pump, C, which is arranged with the driving member, except that it is preferred to support cams or abutments for said motors or driven pumps in substantially fixed positions relative to a common casing, F. The motor or driven pump, D, consists of a barrel 23 which is keyed at 24 to the part, B, of the driven element, said barrel having a plurality of piston chambers 25 in which operate the reciprocating pistons 26. Said pistons are connected by the pitmen 27 to a rotating member 28, the latter having ball bearing engagement at 29 with the cam or abutment 30. The rotating member 28 is connected by a ring 31 constituting a universal joint between the member 28 and the part, B, of the driven shaft. The cam or actuator 30 is supported at 32 within the part, $f$, of a divided motor casing, F.

The motor or driven pump, E, consists of a barrel 33 which is keyed at 34 to the part, B', of the driven member, said barrel having the piston chambers 35 in which operate the pistons 36, the latter being connected by the pitmen 37 to the member 38 which engages with the cam or abutment 39, the latter being supported in the section, $f'$, of the divided motor casing, F. The cams 30, 39 of the motors, D, E, are supported in the casing, F, in oppositely inclined positions with respect to each other, and each cam is inclined with relation to its complemental pump barrel, whereby the motion of the pistons 26, 36 operate the members 28, 38 to impart rotary motion to the parts, B, B', of the driven element, said parts, B, B', rotating in the same direction as indicated by the arrows in Fig. 1.

The casing, F, comprises hollow sections, $f$, $f'$, and head, F', the latter being constructed in the form of a casting which unites sections, $f$, $f'$, to each other, and to which head, F', the pump-casing, $c$, is attached, whereby the parts, $f$, $f'$, $c$, are united into a single substantial structure adapted to incase pump, C, and motors, D, E. In addition to this primary function, the head, F', serves as a seat for a reversing valve, G, which regulates the direction or course of circulation of the liquid. Furthermore, said head, F', is provided with a plurality of passages and chambers which form a closed path for the circulation of the liquid from the pump to one or both of the motors, and from the latter back to the pump.

The head, F', is provided with a member, $g$, which is shown in Fig. 1 as extending into the chamber of pump casing, $c$, said member, $g$, having a face or wall which is in contact with one end of pump barrel 5. As shown, member, $g$, is provided with a socket, $a$, in which is journaled the inner end portion of shaft, A.

Member, $g$, is provided, also, with a plurality of liquid chambers 40, 41, separated by an intervening wall $42^a$, see Fig. 3, and communicating with these chambers are ports 42 located in rotary pump barrel 5 on shaft, A, (see Fig. 1), whereby each port 42 and piston chamber 10 is adapted to register, successively, with the chambers 40, 41, during the rotation of pump barrel 5 with shaft, A.

The head, F', is provided with four curved liquid chambers arranged in pairs, the chambers 43, 44 of one pair being in the respective faces or sides of the wall $42^a$, and in positions corresponding to each other (see Fig. 2), whereas two other similarly curved and positioned chambers (one of which is shown at 45 in Fig. 3 and the position of the other being indicated at $45^a$ in Fig. 1) are below chambers 43, 44. A split or divided passage 46 in head, F', connects chambers 43, 44, with the chamber 40, and a similarly split or divided passage 47 connects the other chamber 41 with said other pair of curved chambers 45, $45^a$. Said passages 46, 47 are separated by wall $42^a$, so that they do not communicate.

A transverse opening 48, circular in cross section, is provided in head, F', intermediate the chambers 40, 41, the curved chambers 43, 44, and the aforesaid curved chambers indicated at 45, $45^a$, said opening 48 intersecting the passages 46, 47 and forming a seat for valve, G.

Said valve, in the present embodiment of the invention, is represented as a conical plug having a check nut, $g'$, at one end and a protruding operating stem, $g^2$, at its other end (see Fig. 3), to which stem, $g^2$, is adapted to be connected any suitable means for manual operation by the driver, whereby valve, G, may be adjusted by rotating the same in its seat 48. The valve contains two ports or ways 50, 51, which are adapted to register with the passages 46, 47, respectively, and said valve is located in these passages at the point where they split or divide, see Fig. 2.

For convenience and brevity of description, the several chambers 40, 41, 43, 44, 45, $45^a$ and passages 46, 47, will hereafter be referred to as a liquid circuit, said circuit being provided in head, F', for the purpose of permitting the liquid to pass between circulating pump, C, and motors, D, E.

The barrels 23, 33, of the driven pumps or motors, D, E, engage with the respective walls or faces of head, F', as shown in Fig. 1, the said head being between the motors. The barrel 23 is provided at its inner end with ports 52, opening into piston chambers 25, and said pump barrel 23 has such relation to the chambers 43, 45 in one face of head, F', as will cause each port 52 and its complemental piston chamber 25 to register successively with said chambers 43, 45 (see Fig. 3) during each rotation of the barrel 23 with the driven part, B.

In like manner, barrel 33 of motor or driven pump, E, is provided at its inner end with ports 53, each opening into one of the piston chambers 35. The barrel 33 has such relation to the other pair of curved chambers 44, $45^a$, that, on each turn of the barrel 33 with the driven part, B', each port 53 and the corresponding piston chamber 35 will register successively with the two said curved chambers 44, $45^a$.

Assuming that the apparatus is in condition for operation as shown in Fig. 1, the pump, C, forces liquid through the chamber 40, the port 50 of the valve, G, the branches of the passage 46 and the chambers 43, 44 into certain cylinders of motors, D, E, thereby driving certain pistons 26, 36 for rotating the driven parts, B, B', simultaneously and in the same direction, as indicated by the arrows. At the same time the pump, C, draws liquid into certain of its cylinders 10 through the chamber 41, the port 51 of valve, G, the branches of passage 47, and the chambers 45, $45^a$ so as to exhaust liquid from other chambers 26, 36 of the motor barrels 23, 33. As the pump and motors rotate with their respective shafts, A, B, B', the liquid is forced to circulate continuously back and forth between the pump and the motors, for the purpose of operating the latter from the former.

When driving straight ahead, the valve, G, is adjusted to a position midway between the branches of passages 46, 47, see Fig. 1, and the liquid circulated by pump, C, is delivered equally to motors, D, E.

In steering the vehicle around a curve, the inside wheel, which follows the shortest radius of the curve, must turn at a speed reduced in proportion to the increase in speed of the outside wheel, the latter following the arc of greater radius. The liquid operated differential gear attains the foregoing result by the resistance to the rotation of one motor, D or E, offered by the retarded inside wheel, said resistance precluding the normal operation of the pistons so that the column of liquid from the valve, G, to the retarded motor is almost at a standstill. In consequence of this operation, the fluid circulated by the pump is diverted into the other freely working motor, whereby the wheel on the inside of the curve is almost at rest, whereas the wheel on the outside of the curve is rotated at a proportionately increased speed. The described operation takes place automatically on a deviation from a straight course by the vehicle, and it is apparent that such operations are performed when turning either to the right or the left.

Should the progress of the vehicle be arrested by reason of one driving wheel lodging in a muddy spot, or be retarded by some other obstruction in the road, the mechanism is adapted for operation in a manner to readily start the car.

We will assume, however, that pump, C, is operating to force the liquid to the motors, and that one motor, as D, is arrested by reason of its wheel being caught in the obstruction; then the liquid is forced into the chambers of the other motor, E, associated with the freely turning or uncaught wheel, thus driving the latter at a high rate of speed to the detriment of its tire, by reason of the frictional engagement with the ground. Under such conditions, the driver can adjust valve, G, and close one branch of the passages 46, 47 leading to and from motor, E, thereby forcing all the liquid into the other motor, D, thus throwing the full power of the engine into the caught or lodged wheel for the purpose of starting the vehicle. The valve, G, may, of course, be adjusted to permit the liquid to enter both motors when both rear wheels of the vehicle are again on firm ground or are free from obstructions. Should the other rear wheel be caught, said valve, G, may be reversed to apply the power to the motor associated with said wheel.

The capacity of the pump, C, may be varied by adjusting the abutment 8 to different positions with reference to the shaft, A, said pump running idle when the abutment is adjusted at right angles to the shaft. When the capacity is varied, the speed of the driven shafts may be regulated or varied with reference to that of the driving shaft.

The pump, C, may be reversed, in order to produce a backward drive, by positioning the abutment 8 at an inclination to shaft, A, the reverse of that shown in Fig. 1. In this case, the shaft, A, continues to rotate in the same direction as when the pump abutment is positioned at the inclination shown in Fig. 1; but the rotation of the driven shafts, B, B', is reversed.

In operating the mechanism as a brake, the pump cam may be positioned at right angles to shaft, A, the engine continuing to run, whereby the resistance offered to the motors stops or locks their respective shafts, and, accordingly, stops the rotation of the rear wheels of the vehicle.

The mechanism may be operated as a brake, also, by allowing the cam abutment to remain at an angle to the shaft and shutting off the engine, in which case the resistance afforded by the compression in the engine cylinders serves to gradually lock the shafts, B, B', against rotation, whereupon the car is brought to a stop.

Having thus fully described the invention, what I claim as new, and desire to secure by Letters Patent is:

1. In a differential gear, a two-part shaft, a driving element, a reversible pump operated by said driving element, a power transmitting device intermediate said pump and the parts of said shaft, and means whereby said power transmitting devices are controllable for applying power on either part of said shaft substantially to the exclusion of the other part thereof, or whereby said two-part shaft may be driven in one direction or the other by reversing the pump.

2. In a differential gear, a two-part shaft, a driving element, a reversible pump operated by said driving element, power transmitting devices intermediate said pump and the parts of said shaft, and means whereby the power of said pump may be discontinued from one part of the shaft and concentrated on or applied to the other part thereof, said parts of the shaft, or either of them, being driven in one direction by the pump and said power transmitting devices.

3. In a differential gear, a driving element, a two-part shaft, a fluid circulating pump, fluid operated motors associated with the parts of said shaft, a fluid circuit intermediate the pump and said motors, and a single valve located in said circuit for directing the fluid to either of said motors substantially to the exclusion of the other motor.

4. In a differential gear, the combination of a driving shaft, a two-part driven shaft, a liquid circulating pump having associated therewith an adjustable element operable to vary the capacity and to reverse the action of the pump pistons, fluid operated motors of substantially equal capacity coöperating with the respective parts of said two-part shaft, a fluid circuit intermediate said liquid circulating pump and said fluid operated motors, and valve mechanism for controlling the liquid circulated by the pump whereby the power of the fluid circulated by the pump may be concentrated upon one of said motors and one part of said driven shaft substantially to the exclusion of the other motor and the other part of said driven shaft.

5. In a differential gear, a driving element, a pump operated thereby, a two-part shaft, separate motors of equal capacity coöperating with the respective parts of said shaft, a casing having fluid passages adapted to supply a fluid to said motors, and a valve in said passage for cutting off the fluid from one motor and directing the same into the other motor, or vice versa.

6. In a transmission mechanism, a driving element or shaft, a two-part driven element, a plurality of motors for operating the driven element, a pump, reversible independently of the driving element, coöperating with said motors, and valve mechanism operated at will for directing the liquid circulated by the pump into either of said motors substantially to the exclusion of the other motor.

7. In a transmission mechanism, a driving element or shaft, a two-part driven element, a plurality of liquid operated devices coöperating with the driven element, pumping mechanism adapted to run idly and offer resistance to the current of liquid from the liquid operated devices, and valve mechanism operated at will for directing the liquid circulated by the pump into either of said motors substantially to the exclusion of the other motor.

8. In a transmission mechanism, an engine shaft, a two-part driven element, a plurality of liquid operated devices coöperating with the driven element, a pump coöperating with said liquid operated devices, said pump being capable of adjustment for offering resistance to the liquid circulated by said fluid operating devices, and valve mechanism operated by hand for controlling the direction of the liquid circulated by the pump whereby the pressure of the liquid may be concentrated on one motor substantially to the exclusion of the other motor.

9. In a differential gear, a driving element, a driven element consisting of a plurality of parts, a fluid circulating pump operated by said driving element, separate motors each coöperating with one part of said driven element, a fluid circuit between the pump and the motors, said circuit being composed of sets of supply and return passages, and a single valve intercepting each set of said supply and return passages and adapted to close one set of said passages leading to one motor and simultaneously open the set of passages leading to the other motor.

10. In a differential gear, a driving shaft, a liquid circulating pump operated thereby, said pump having a member associated therewith for reversing the operation of said pump, a two-part driven shaft, separate motors coöperating with the respective parts of the driven shaft, said separate motors being operated by the liquid which is circulated by the first pump, and mechanism controllable at will for concentrating the force of the liquid upon one of the two last-mentioned motors substantially to the exclusion of the other of said motors.

11. In a differential gear, a driving shaft, a liquid circulating pump operated thereby, said pump having associated therewith a member whereby the capacity of said pump may be varied and its action may be reversed, a two-part driven shaft, separate motors coöperating with the respective parts of said driven shaft and adapted to be operated by the first pump, and mechanism controllable at will whereby the power of the liquid circulated by the first pump may be concentrated upon one of said two last-mentioned motors substantially to the exclusion of the other of said motors.

12. In a liquid transmission, the combination of a drive shaft, a multi-piston pump operated directly by said drive shaft, said pump embodying pistons and cylinders which are rotatable with said driving shaft and the pistons of which are reciprocable with respect to their cylinders, a two part driven shaft, a plurality of multi-piston motors coöperating with the respective parts of said driven shaft, each motor embodying pistons and cylinders rotatable with the driven shaft part and the pistons of which are reciprocable with respect to their cylinders, and liquid passages connecting the cylinders of the pump with the cylinders of the respective motors, said multi-piston motors being independent of each other and free to rotate at different relative speeds under variable resistances interposed by the respective parts of said driven shaft to the driving force applied constantly to said motors by the fluid circulated by the action of said pump.

13. In a liquid transmission, the combination with a drive shaft, of a multi-piston pump operated directly by said drive shaft, said pump embodying pistons and cylinders which are rotatable with said drive shaft and said pump pistons being reciprocable with respect to their cylinders, a piston actuating element or abutment rotatable with the drive shaft and shiftable at will for varying the stroke of said pistons whereby the capacity of the pump may be varied, a two-part driven shaft, a plurality of multi-piston motors coöperating with the respective parts of said driven shaft, each motor embodying pistons and cylinders rotatable with the driven shaft part and the motor pistons being reciprocable with respect to their cylinders, and means whereby the liquid forced by the multi-cylinder pump is supplied to the multi-cylinder motors, said multi-piston motors being independent of each other and free to rotate at different relative speeds under variable resistances interposed by the respective parts of said driven shaft to the driving force applied constantly to said motors by the fluid circulated by the action of said pump.

14. In a liquid transmission, the combination with a drive shaft, of a multi-piston pump operated directly by said drive shaft, said pump embodying pistons and cylinders which are rotatable with said drive shaft and said pump pistons being reciprocable with respect to their cylinders, a piston actuating element or abutment rotatable with the drive shaft and reversible at will for reversing the action of said pistons whereby the pump is adapted for operation in forcing liquid in one direction or the other, a two-part driven shaft, a plurality of multi-piston motors coöperating with the respective parts of said driven shaft, each motor embodying pistons and cylinders rotatable with the driven shaft part and the motor pistons being reciprocable with respect to their cylinders, and means whereby the liquid forced by the multi-cylinder pump is supplied to the multi-cylinder motors, said multi-piston motors being independent of each other and free to rotate at different relative speeds under variable resistances interposed by the respective parts of said driven shaft to the driving force applied constantly to said motors by the fluid circulated by the action of said pump.

15. In a liquid transmission, the combination of a drive shaft, a multi-piston pump operated directly by said drive shaft, said pump embodying pistons and cylinders which are rotatable with said driving shaft and the pistons of which are reciprocable with respect to their cylinders, a two-part driven shaft, a plurality of multi-piston motors coöperating with the respective parts of said driven shaft, each motor embodying pistons and cylinders rotatable with the driven shaft part and the pistons of which are reciprocable with respect to their cylinders, the outlet of said pump being connected for feeding liquid to the intakes of the motors and the discharge ports of said motors being connected with the intake of said pump, whereby the liquid is circulated between the pump and motor, said multi-piston motors being independent of each other and free to rotate at different relative speeds under variable resistances interposed by the respective parts of said driven shaft to the driving force applied constantly to said motors by the fluid circulated by the action of said pump.

16. The combination of a drive shaft, a pump driven thereby, and comprising a rotary cylinder barrel and pistons reciprocating in said barrel lengthwise of its axis of rotation, adjusting mechanism for varying the stroke of the said reciprocating pistons and thereby the volume of fluid propelled by the pump per revolution of the barrel, a chamber arranged to receive all the fluid propelled by said pump, and a plurality of motors having individual connections to said chamber and arranged to receive, and to be driven by, the fluid propelled by said pump, each of said motors comprising a rotary cylinder barrel and pistons reciprocating in said barrel lengthwise of its axis of rotation.

17. The combination of a drive shaft, a pump driven thereby and comprising a rotary cylinder barrel and pistons reciprocating in said barrel lengthwise of its axis of rotation, adjusting mechanism for varying the stroke of the said reciprocating pistons and thereby the volume of fluid propelled by the pump per revolution of the barrel, a chamber arranged to receive all the fluid propelled by said pump, a plurality of motors having individual connection to said chamber and arranged to receive, and to be driven by, the fluid propelled by said pump, each of said motors comprising a rotary cylinder barrel and pistons reciprocating in said barrel lengthwise of its axis of rotation, and connections through which the fluid after doing work in said motors is returned to the pump.

In testimony whereof I have signed my name to this specification in the presence of two subscribing witnesses.

CHARLES SNOW KELLOGG.

Witnesses:
 Jas. H. Griffin,
 H. I. Bernhard.